(12) United States Patent
Zhang

(10) Patent No.: US 7,610,689 B1
(45) Date of Patent: Nov. 3, 2009

(54) LEVEL HAVING ROTATABLE DIGITAL DISPLAY UNIT

(76) Inventor: Minli Zhang, Room 302, Unit A, Building 26, Huai De Yuan, Changzhou, Jiangsu (CN)

( * ) Notice: Subject to any disclaimer, the term of this patent is extended or adjusted under 35 U.S.C. 154(b) by 31 days.

(21) Appl. No.: 12/098,894

(22) Filed: Apr. 7, 2008

(51) Int. Cl.
*G01C 9/06* (2006.01)

(52) U.S. Cl. .................. 33/366.11; 33/366.27

(58) Field of Classification Search .......... 33/366.11, 33/366.27, 383, 384, 385, 368
See application file for complete search history.

(56) References Cited

U.S. PATENT DOCUMENTS

| | | | | |
|---|---|---|---|---|
| 4,590,682 A | * | 5/1986 | Koch | 33/383 |
| 4,942,668 A | * | 7/1990 | Franklin | 33/366.14 |
| 5,177,873 A | * | 1/1993 | Tate | 33/385 |
| 5,592,745 A | * | 1/1997 | Heger et al. | 33/366.12 |
| 6,585,203 B1 | * | 7/2003 | Euker | 248/200.1 |
| 7,151,911 B2 | * | 12/2006 | Matsumoto | 455/90.2 |
| 7,280,166 B2 | * | 10/2007 | Nagata et al. | 348/837 |
| 7,363,719 B2 | * | 4/2008 | Levinson et al. | 33/384 |

\* cited by examiner

*Primary Examiner*—G. Bradley Bennett
(74) *Attorney, Agent, or Firm*—Boyle Fredrickson, S.C.

(57) ABSTRACT

The utility model relates to a display means of digital level. Said digital level is provided with one notch in basal body, where said display lies. Two ends of said display are provided with two center-axles that lie in the same axis line of rotation, and two sidewalls of said notch are provided with two center-axle-holes, wherein said display is rotatablely connected with said basal body of digital level by inserting said two center-axles into said two center-axle-holes. Said display of this utility model is rotatable, so in practical application, user can locate this display on the desired position, thus to read the value shown thereon conveniently. Moreover, the positioning and position restriction to the rotation of said display could suit many conveniences for users to read the value shown thereon.

21 Claims, 5 Drawing Sheets

LEVEL HAVING ROTATABLE DIGITAL DISPLAY UNIT

CROSS REFERENCE TO RELATED APPLICATION

The present application claims the priority of Chinese Application 200720035901 filed Apr. 5, 2007, the disclosure of which is incorporated herein by reference.

FIELD OF THE INVENTION

The utility model relates to the parts of digital level, i.e. display means of digital level.

BACKGROUND OF THE INVENTION

Digital level usually has display, so in the present market, the digital level is provided with windows in the middle of the front and back side of housing, where the display is fixed between the front window and the back window. The display has dual-sided screen, so user can get the reading shown thereon both from the front and from the back. In practical application, if user lies in the front or the back of digital level, he can read the display value very conveniently; however, if digital level is overhead or on the ground relative to user, it will be a little difficult for him to read the display value.

SUMMARY OF THE INVENTION

It is the object of this utility model to introduce a display means of digital level that can facilitate user of reading the value displayed. The technical proposal for realizing the intention of this utility model is described as follows:

This utility model includes a basal body and a display, wherein said basal body is provided with a notch where said display lies. On two ends of said display there are two center axles that lie in the same axis line of rotation. Two sides of said basal body notch are provided with two center axle holes. By inserting said two center axles into said two axle-holes, said display is rotatablely connected with said basal body.

Said basal body includes front cover board, main bracket and back cover board. Main bracket is provided with upper cover board and lower cover board. The column that connects said upper and lower cover boards, U-shape bracket between two columns, said front cover board and said back cover board hold said main bracket therein, and the connecting piece is for connection purpose.

Said upper cover board of basal body is one integrated board, which is provided with one opening on the position opposite to said notch.

Said upper cover board of basal body is the separate board, and lies in two side of said notch respectively.

Said lower cover board of basal body is provided with opening.

Said basal body further includes end cover fixed onto said main bracket.

Two sidewalls of said notch on said basal that hold said display consist of said front cover board, said U-shape bracket and said back cover board. Two walls of said U-shape bracket are provided with half-axle holes, and the part of said front cover board that adjoins said two sides of said U-shape bracket is also provided with half axle holes, and these half axle-holes together form the center axle holes that match said center axles of said display.

Said center axle on one end of said display is positioning axle, on which there is elastic positioning piece. The inside wall of axle hole that corresponds to positioning axle is provided with 2 to 4 positioning slots, which is so placed that said display can just positioned horizontally or vertically when said elastic positioning piece enters said positioning slot.

Said positioning axle of said display is hollow plastic axle, whose wall is provided with U-shape slot of axial direction. What is encircled by said U-shape slot is said elastic positioning piece, whose end is provided with protruding deck that matches said positioning slot.

Said center axle on the other end of said display is position-restriction axle, which is provided with protruding deck. The inside wall of the axle hole that corresponds to said position-restriction axle is provided with obstacle steps that can limit the rotated angle of position-restriction axle.

This utility model enjoys the features as follows:
1. Said display of this utility model is rotatable, so in practical application, user can locate this display on the desired position, thus to read the value shown thereon conveniently. Moreover, the positioning and position restriction to the rotation of said display could suit many conveniences for users to read the value shown thereon.
2. The utility model is simple and compact in structure.

BRIEF DESCRIPTION OF THE DRAWINGS

The accompanying drawings, which are incorporated in and constitute part of the specification, schematically illustrate a preferred embodiment of the utility model and, together with the general description given below, serve to explain the principles of the utility model.

DETAILED DESCRIPTION OF THE INVENTION

Figure 1:
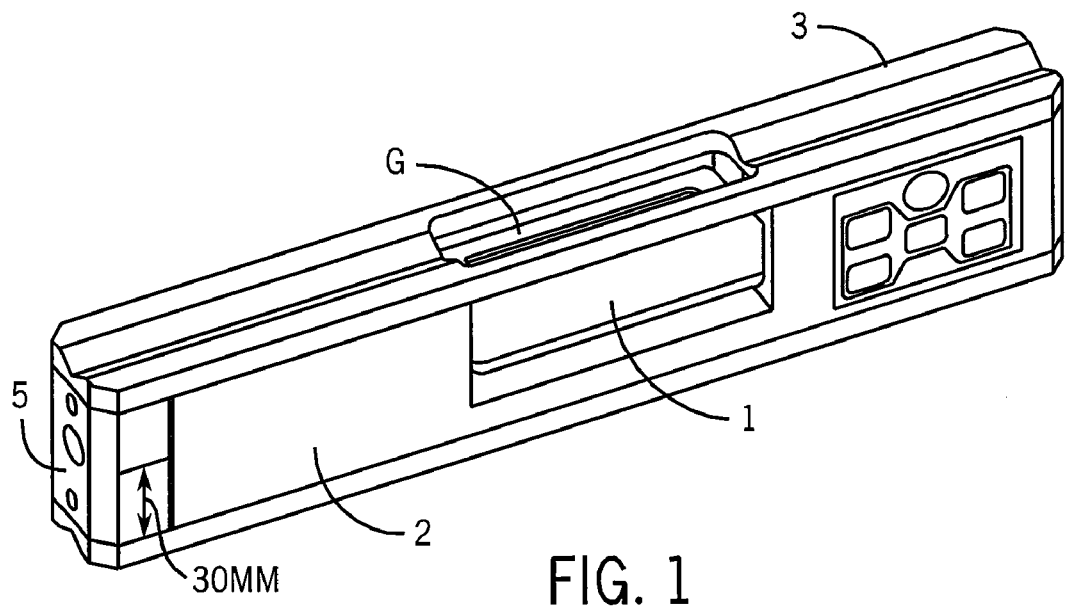
FIG. 1 is a complete view of the preferred embodiment.
Figure 2:
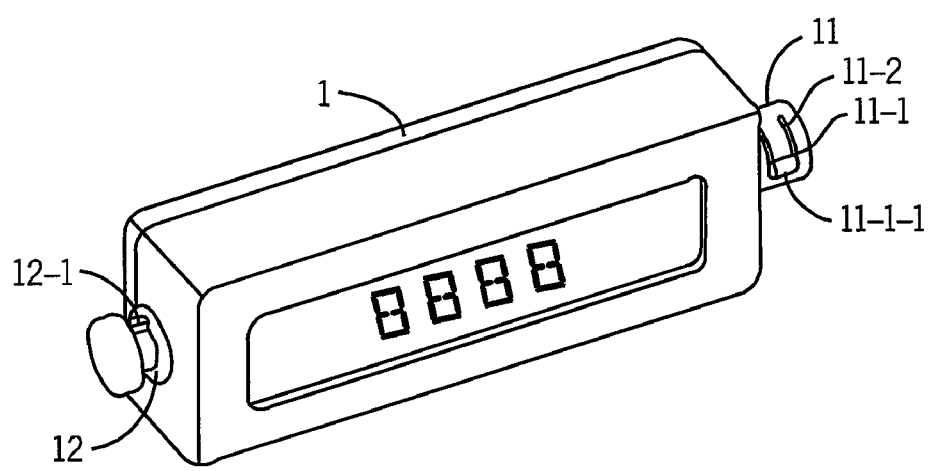
FIG. 2 is a complete view of the display.

As shown in FIG. 1, the preferred embodiment comprises a basal body and a display (1), wherein said basal body is provided with a notch (G) where said display (1) lies. As shown in FIG. 2, two ends of said display (1) are provided with two center-axles (11, 12) that lie in the same axis line of rotation.

Figure 3:
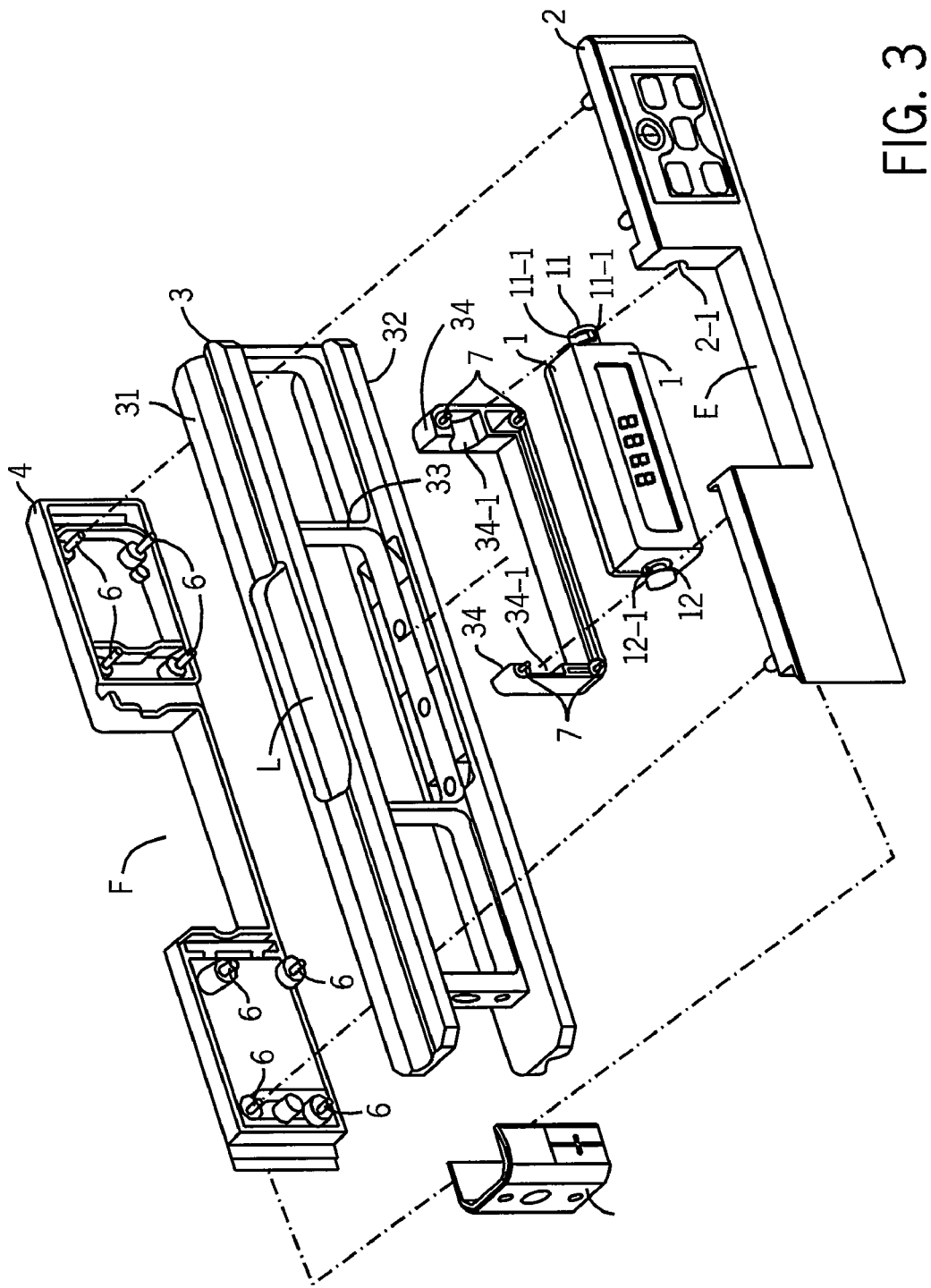
FIG. 3 is a 3D exploded view of the preferred embodiment.
Figure 4:
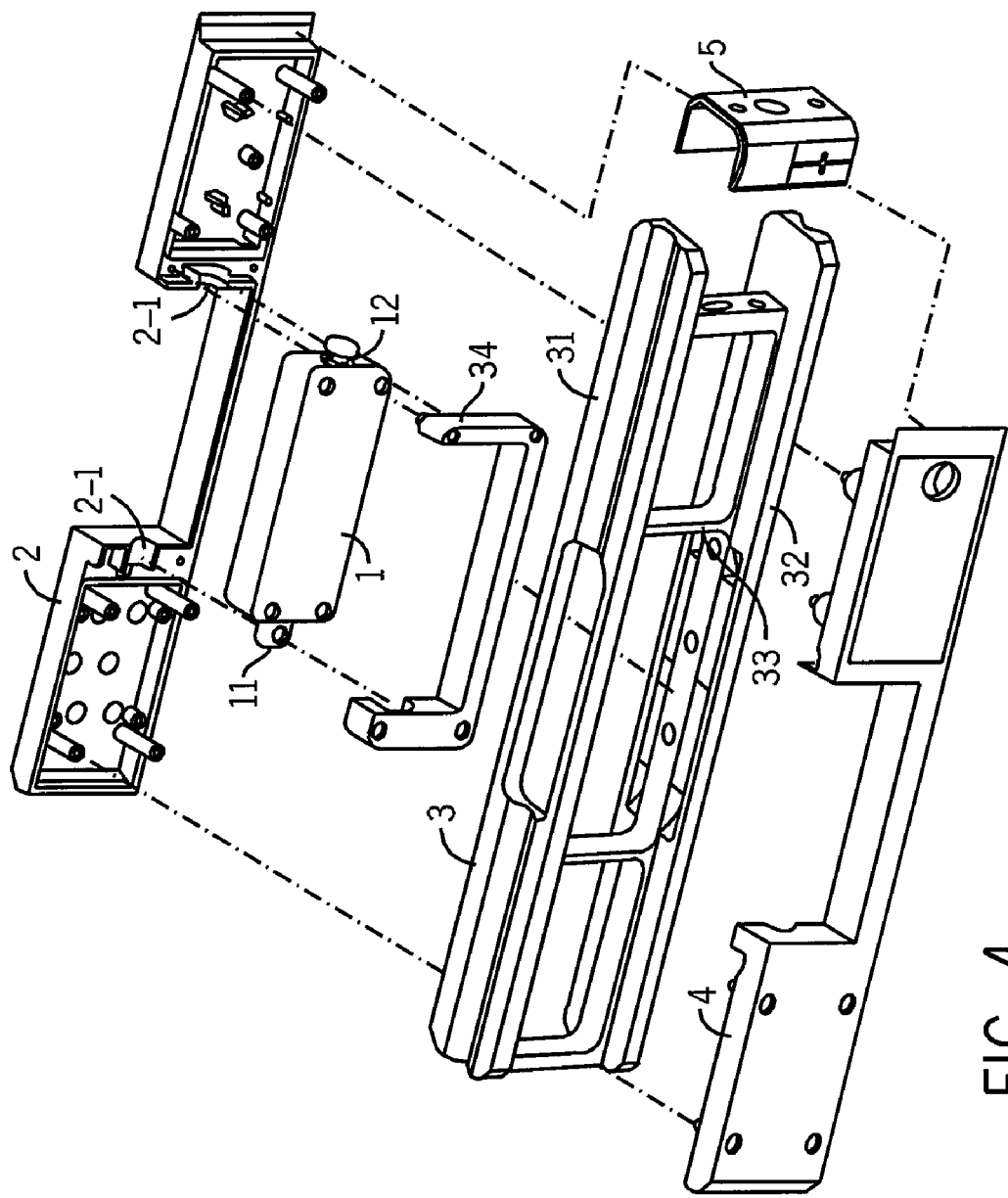
FIG. 4 is another 3D exploded view of the preferred embodiment on the contrary direction.

As shown in FIG. 3 and FIG. 4, said basal body includes front cover board (2), main bracket (3), back cover board (4) and end cover 5. Said front cover board (2) and back cover board (4) are provided with a notch E and a notch F respectively, which makes both said front cover board (2) and said back cover board (4) in U-shape. Said notch E an F on said front and back cover board 31 and 32 form said basic notch G. Said main bracket (3) is composed of upper cover board (31), lower cover board (32), the columns 33 that connect said upper cover board (31) and said lower cover board (32), the U-shape bracket (34) that lies between two said middle columns (33). Said main bracket (3) could be a integrated one, but, as for this preferred embodiment, said upper and lower cover board 31, 32 and said columns 33 are integrated one, and said U-shape bracket 34 is connected with said front cover by screw 7. Said upper cover board 31 is integrated one, which is provided with the opening (L) in the position opposite to said notch E, F of said front and back cover board 2, 4. Said front cover board (2) and said back cover board (4) hold said main bracket (3) therein, and said connecting piece (6) is screw. Said end cover (5) that is fixed onto one end of said main bracket (3) by screw.

Figure 5:
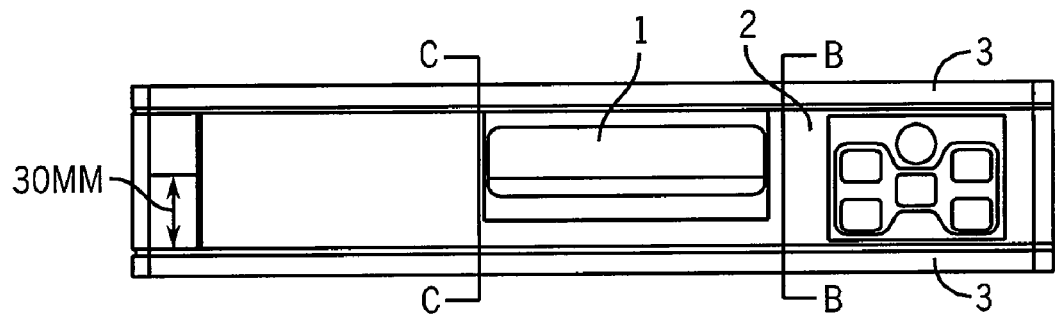
FIG. 5 is a front view of the preferred embodiment.
Figure 6:
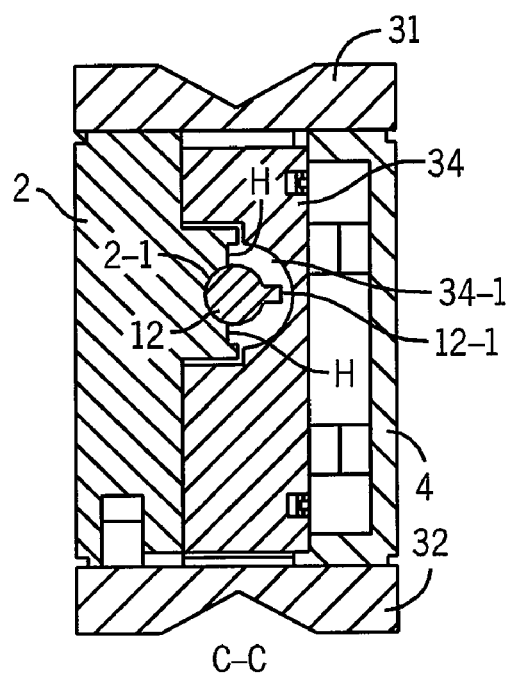
FIG. 6 is a C-C sectional view of FIG. 5.
Figure 7:
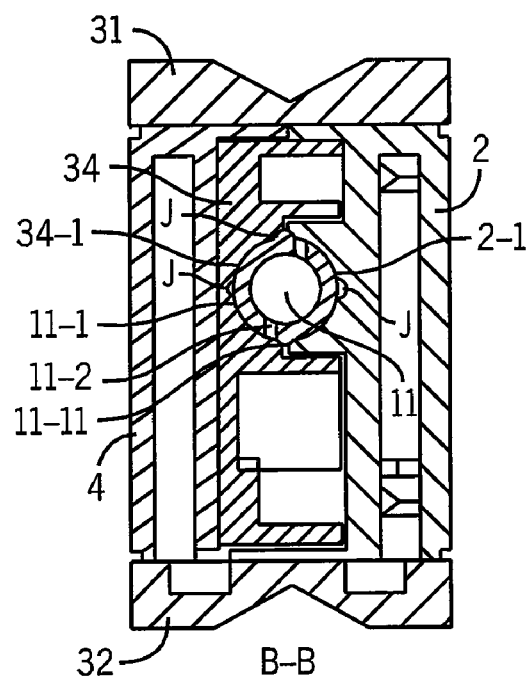
FIG. 7 is a B-B sectional view of FIG. 5.

As shown in FIG. 5 to FIG. 7, two sidewalls of said notch that deposits said display are provided with the axle-holes for said axles that lie in the same axis line. Said two sidewalls are composed by proper parts of said front cover 2, U-shape bracket 34 and said back cover 4. Two sidewalls of U-shape bracket are respectively provided with half-axle-holes (34-1), and the proper parts of said front cover board that adjoin said two sidewalls of said U-shape bracket are also respectively provided with half axle-holes (2-1). Said half-axle-holes (34-1) on the sidewalls of said U-shape bracket and said half-axle-holes (2-1) on the part of said front cover board together form the center axle holes that match the center axles of said display.

As shown in FIG. 7, said center axle on one end of said display is the positioning axle 11. Said positioning axle 11 of said display is hollow plastic axle, on which there is elastic positioning piece 11-1. There is axial U-shape slot 11-2 on the wall, and what is encircled by said axial U-shape slot 11-2 is said elastic positioning piece 11-1, whose end is provided with protruding deck 11-11 that matches said positioning slot. The inside wall of axle hole that corresponds to said positioning axle 11 is provided with 4 positioning slots J. Herein, one positioning slot J lies inside the half-axle hole 34-1 of said sidewall of said U-shape bracket, one positioning slots J lies inside the half-axle hole 2-1 of said sidewall of said front cover board, and two positioning slots J lie in the position where said two half-axle holes adjoin. Said positioning slots is so placed that said display 1 can just positioned horizontally or vertically when said elastic positioning piece 11-1 enters said positioning slot.

As shown in FIG. 6, said center axle on the other end of said display 1 is the position-restriction axle 12, which is provided with protruding deck 12-1. The inside wall of the axle hole that corresponds to said position-restriction axle 12 is provided with obstacle steps h that can limit the rotated angle of position-restriction axle within the range of 180°.

Both said front cover board and said back cover board are just named according to the position on the figures. Said front cover board can serve as the keypad which has buttons thereon. It is also possible to make said back cover as the keypad.

Figure 8:
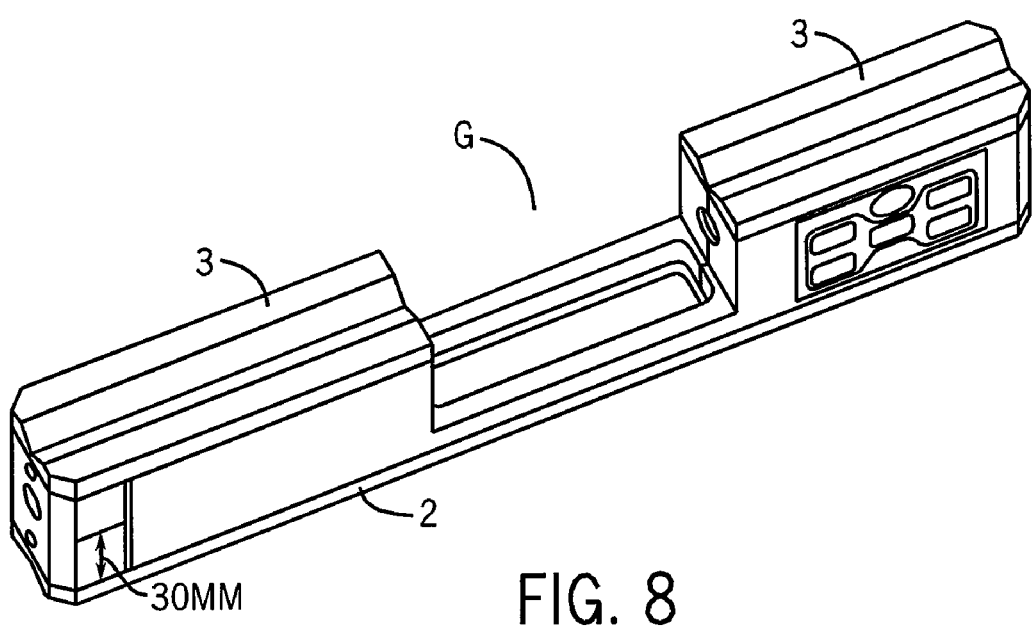
FIG. 8 is a structural drawing of the preferred embodiment.

As shown in FIG. 8, said upper cover board 31 of said basal body is the separate one, wherein said lower cover board 32 is provided with the opening on the position opposite to said notch of said basal body. Except this said point, preferred embodiment 2 is totally the same as preferred embodiment 1.

I claim:

1. A level comprising:
   a basal body having at least one gauging surface;
   a cavity formed in the basal body; and
   a display unit disposed within the cavity, wherein the display unit is rotatable relative to and independently of the basal body.

2. The level of claim 1 wherein the display unit is rotatable about an axis of rotation that is parallel to the gauging surface.

3. The level of claim 2 wherein the cavity is partially defined by a pair of upright sidewalls spaced from one another and wherein each upright wall includes a center axle hole.

4. The level of claim 3 wherein the display unit includes a display body that includes a pair of center axles that lie along the axis of rotation and sized to be received by the center axle holes.

5. The level of claim 1 further comprising a bracket fitted into the cavity and adapted to receive the display unit.

6. The level of claim 5 wherein the bracket is U-shaped.

7. The level of claim 1 wherein the basal body comprises:
   an elongated bracket having a rear surface and a front surface, and wherein the cavity is defined between the rear surface and the front surface;
   a back cover board coupled to the rear surface; and
   a front cover board coupled to the front surface.

8. The level of claim 7 wherein the back cover board and the front cover board are each notched to define a window, and wherein the windows defined by the notched front and rear cover boards are aligned with the cavity.

9. The level of claim 7 further comprising a keypad mounted to one of the back cover board and the front cover board.

10. A level comprising:
    an elongated body having a generally planar edge adapted to abut against a work surface;
    circuitry disposed in the elongated body for measuring a the orientation of the work surface relative to a predetermined plane; and
    a display unit having a visual display, wherein the display unit is mounted to the elongated body and adapted to display a digital value indicative of the orientation of the work surface relative to the predetermined plane, wherein the display unit is mounted to the elongated body so as to be rotatable about an axis of rotation relative to the elongated body.

11. The level of claim 10, wherein the circuitry and the display unit are configured and arranged such that the visual output of the display unit in a predetermined orientation upon rotation of the display unit.

12. The level of claim 10 wherein the axis of rotation is parallel to a longitudinal axis defined by the elongated body, and wherein the elongated body includes an opening extending through the elongated body along an axis transverse to the axis of rotation and wherein the display unit is mounted to the elongated body within the opening.

13. The level of claim 12 further comprising a U-shaped bracket mounted within the opening and adapted to receive the display unit.

14. The level of claim 12 wherein the elongated body includes a main bracket having a pair of upright walls bounding the opening and wherein each upright wall includes a hole such that the holes are aligned along the axis of rotation, and wherein the display unit includes a display body having a pair of center aligned axles sized to be received within the holes.

15. The level of claim 14 wherein the elongated body further includes a front cover board and a rear cover board mounted to respective surfaces of the main bracket and wherein the cover boards are each notched to define respective windows that are aligned with the opening.

16. A digital level comprising:
    a main bracket, a front cover board mounted to a front surface of the main bracket, a rear cover board mounted to a rear surface of the main bracket, and wherein the main bracket, the front cover board, and the rear cover board are notched such that an opening extends through the main bracket, the front cover board, and the rear cover board;
    an electronic display unit mounted within the opening and pivotable about an axis of rotation parallel to a longitudinal axis defined by the main bracket, the front cover board, and the rear cover board.

17. The digital level of claim 16 wherein the electronic display unit has a display unit body sized to be received within the opening and limit rotation of the electronic display unit to less than 360 degrees about the axis of rotation.

18. The digital level of claim 17 wherein the display unit body is sized such that rotation of the electronic display unit about the axis of rotation is limited to less than 180 degrees.

19. The digital level of claim 17 wherein the display unit body includes a first upright wall having a first tab and further includes a second upright wall having a second tab, and wherein the first and the second tabs are adapted to fit within respective openings formed in the main bracket, wherein the openings are centered about the axis of rotation.

20. The digital level of claim 16 further comprising a U-shaped bracket located within a notch formed in the main bracket and adapted to receive the electronic display unit, and wherein the U-shaped bracket is secured within the notch by the front cover board and the rear cover board.

21. The digital level of claim 16 further comprising means for emitting a laser beam along a projection path generally parallel to the axis of rotation.

* * * * *